United States Patent [19]

Strongin et al.

[11] Patent Number: 5,784,494
[45] Date of Patent: Jul. 21, 1998

[54] METHOD AND APPARATUS FOR PRESTORING DEQUANTIZATION INFORMATION FOR DCT VLC DECODING

[75] Inventors: Geoffrey Strongin; Yi Liu; Michael Tucker, all of Austin, Tex.

[73] Assignee: Advanced Micro Devices, Inc., Sunnyvale, Calif.

[21] Appl. No.: 424,736

[22] Filed: Apr. 18, 1995

[51] Int. Cl.[6] .................... G06K 9/36; G06K 9/46; H04N 11/02
[52] U.S. Cl. .................... 382/233; 382/245; 382/246; 382/250; 348/426
[58] Field of Search .................... 382/250, 246, 382/245, 233; 348/426

[56] References Cited

U.S. PATENT DOCUMENTS

| 5,289,577 | 2/1994 | Gonzales et al. | 395/163 |
|---|---|---|---|
| 5,357,282 | 10/1994 | Lee | 348/403 |
| 5,371,547 | 12/1994 | Siracusa et al. | 348/426 |
| 5,416,604 | 5/1995 | Park | 358/433 |
| 5,450,599 | 9/1995 | Horvath et al. | 395/800 |
| 5,489,943 | 2/1996 | Kutner | 348/405 |
| 5,502,493 | 3/1996 | Meyer | 348/409 |
| 5,515,105 | 5/1996 | Lim | 348/405 |
| 5,523,847 | 6/1996 | Feig et al. | 358/261.3 |
| 5,526,054 | 6/1996 | Greenfield et al. | 348/426 |
| 5,532,744 | 7/1996 | Akiwumi-Assani et al. | 348/398 |
| 5,565,921 | 10/1996 | Sasaki et al. | 348/409 |

*Primary Examiner*—Andrew W. Johns
*Assistant Examiner*—Monica S. Davis
*Attorney, Agent, or Firm*—Skjerven, Morrill, MacPherson, Franklin & Friel LLP; Ken J. Koestner

[57] ABSTRACT

A DCT VLC decoding method substantially lessens the computational burden of picture dequantization. The method of decoding variable length code (VLC) data includes the step of receiving a bitstream sequence organized into a hierarchy of levels including, in order, a sequence layer, a group of pictures layer, a picture layer, a slice layer, a macroblock layer, and a block layer. In the sequence layer, the method defines a quantization matrix. In a macroblock layer, the method defines a quantizer scale parameter in the macroblock layer, multiplies the quantization matrix times the quantizer scale parameter and stores the product in a quantization multiplication factor. In the block layer, the method parses an encoded data bitstream to detect a VLC code in the block layer and dequantizes the VLC code by multiplying the VLC code times the quantization multiplication factor.

6 Claims, 6 Drawing Sheets

METHOD AND APPARATUS FOR PRESTORING DEQUANTIZATION INFORMATION FOR DCT VLC DECODING

RELATED PATENT APPLICATIONS

The present invention is related to subject matter which is disclosed in:

U.S. patent application Ser. No. 08/423,913 filed on the same day as the present patent application (Geoffrey S. Strongin, Yi Liu and Michael R. Tucker, "Method and Apparatus for Improved Video Decompression by Selection of IDCT Method Based on Image Characteristics", Attorney Docket Number M-3223), U.S. patent application Ser. No. 08/423,918 filed on the same day as the present patent application (Michael R. Tucker, Geoffrey S. Strongin and Yi Liu, "Method and Apparatus for Improved Video Decompression by Prescaling of Pixel and Error Terms Prior to Merging", Attorney Docket Number M-3224), U.S. patent application Ser. No. 08/423,912 filed on the same day as the present patent application (Yi Liu, Michael R. Tucker and Geoffrey S. Strongin, "Method and Apparatus for Improved Video Decompression by Selective Reduction of Spatial Resolution", Attorney Docket Number M-3225), U.S. patent application Ser. No. 08/424,738 filed on the same day as the present patent application (Yi Liu, Michael R. Tucker and Geoffrey S. Strongin, "Method and Apparatus for Hybrid VLC Bitstream Decoding", Attorney Docket Number M-3226).

Each of the identified patent applications is incorporated herein by reference in its entirety.

The present invention is related to subject matter which is disclosed in:

U.S. patent application Ser. No. 08/443,206 filed on the same day as the present patent application (Yi Liu, Michael R. Tucker, and Geoffrey S. Strongin, "Method and Apparatus for Improved Video Decompression by Adaptive Selection of Video Input Parameters", Attorney Docket Number M-3228), and U.S. patent application Ser. No. 08/423,914 filed on the same day as the present patent application (Geoffrey S. Strongin, Yi Liu and Michael R. Tucker, "Method and Apparatus for Improved Video Decompression by Predetermination of IDCT Results Based on Image Characteristics", Attorney Docket Number M-3280).

FIELD OF INVENTION

The present invention relates to decompression of video information and, more particularly, to efficient parsing of variable length coded video information in a decompression process.

BACKGROUND OF THE INVENTION

Video information requires a large amount of storage space, therefore video information is generally compressed before it is stored. Accordingly, to display compressed video information which is stored, for example, on a compact disk read only memory (CD ROM), the compressed video information must be decompressed to provide decompressed video information. The decompressed video information is then provided in a bit stream to a display. The bit stream of video information is generally stored in a plurality of memory storage locations corresponding to pixel locations on a display, the stored video information is generally referred to as a bit map. The video information required to present a single screen of information on a display is called a picture. A goal of many video systems is to quickly and efficiently decode compressed video information so as to provide motion video.

Standardization of recording media, devices and various aspects of data handling, such as video compression, is highly desirable for continued growth of this technology and its applications. One compression standard which has attained wide spread use for compressing and decompressing video information is the moving pictures expert group (MPEG) standard for video encoding and decoding. The MPEG standard is defined in International Standard ISO/IEC 11172-1, "Information Technology—Coding of moving pictures and associated audio for digital storage media at up to about 1.5 Mbit/s", Parts 1, 2 and 3, First edition 1993-08-01 which is hereby incorporated by reference in its entirety.

Pictures within the MPEG standard are divided into 16×16 pixel macroblocks. Each macroblock includes six 8×8 blocks: four luminance (Y) blocks, one chrominance red (Cr) block and one chrominance blue (Cb) block. The luminance blocks correspond to sets of 8×8 pixels on a display and control the brightness of respective pixels. The chrominance blocks to a large extent control the colors for sets of four pixels. For each set of four pixels on the display, there is a single Cr characteristic and a single Cb characteristic.

For example, referring to FIG. 1, labeled prior art, a picture presented by a typical display includes 240 lines of video information in which each line has 352 pixels. Accordingly, a picture includes 240×352=84,480 pixel locations. Under the MPEG standard, this picture of video includes 44 by 30 luminance blocks or 1320 blocks of luminance video information. Additionally, because each macroblock of information also includes two corresponding chrominance blocks, each picture of video information also includes 330 Cr blocks and 330 Cb blocks. Accordingly, each picture of video information requires 126,720 pixels= 1,013,760 bits of bit mapped storage space for presentation on a display.

There are three types of pictures of video information which are defined by the MPEG standard, intra-pictures (I picture), forward predicted pictures (P picture) and bi-predicted pictures (B picture).

An I picture is encoded as a single image having no reference to any past or future picture. Each block of an I picture is encoded independently. Accordingly, when decoding an I picture, no motion processing is necessary. However, for the reasons discussed below, it is necessary to store and access I pictures for use in decoding other types of pictures.

A P picture is encoded relative to a past reference picture. A reference picture is a P or I picture. The past reference picture is the closest preceding reference picture. Each macroblock in a P picture can be encoded either as an I macroblock or as a P macroblock. A P macroblock is stored within a 16×16 area of a past reference picture plus an error term. To specify the location of the P macroblock, a motion vector (i.e., an indication of the relative position of the picture with reference to the past reference picture) is also encoded. When decoding a P picture, the current P macroblock is created with the 16×16 area from the reference picture. The macroblock from the reference picture is offset according to motion vectors. The decoding function accordingly includes motion compensation, which is performed on a macroblock, in combination with error (IDCT) terms, which are defined on a block by block basis.

A B picture is encoded relative to the past reference picture and a future reference picture. The future reference picture is the closest proceeding reference picture. Accordingly, the decoding of a B picture is similar to that of an I picture with the exception that a B picture motion vector may refer to areas in the future of the reference picture. For macroblocks that use both past and future reference pictures, the two 16×16 areas are averaged. When decoding a B picture the current B macroblock is created with the 16×16 areas from the past and future reference pictures. The macroblock from the reference picture is offset according to motion vectors.

Pictures are coded using a discrete cosine transform (DCT) coding scheme which encodes coefficients as an amplitude of a specific cosine basis function. The DCT coefficients are further coded using variable length coding. Variable length coding (VLC) is a statistical coding technique that assigns codewords to values to be encoded. Values of high frequency of occurrence are assigned short codewords, and those of infrequent occurrence are assigned long codewords. On the average, the more frequent shorter codewords dominate so that the code string is shorter than the original data.

The ISO/IEC 11172-2 standard stipulates for intracoded luminance and chrominance macroblocks that dct_recon [m][n], the matrix of reconstructed DCT coefficients of a block, shall be computed by any means equivalent to the following procedure:

```
for(m=0; m<8;m++){
  for(n=0;n<8;n++) {
    i=scan[m][n];
    dct_recon[m][n]=(2*dct_zz[i]*
         quantizer_scale*intra_quant[m][n])/16;
    if((dct_recon[m][n] & 1)==0)
       dct_recon[m][n]=dct_recon[m][n] -
         Sign(dct_recon[m][n]);
    if(dct_recon[m][n]>2047) dct_recon[m][n] = 2047;
    if(dct-recon[m][n]<-2048)
        dct_recon[m][n] = -2048;
  }
}
dct_recon[0][0]=dct_zz[0]*8;
if((macroblock_address - past_intra_address>1))
    dct_recon[0][0]= (128 *8)+dct_recon[0][0];
else
    dct_recon[0][0]=dct_dc_X_past + dct_recon[0][0];
dct_dc_X_past=dct_recon[0][0];
```

In this procedure, m identifies the row and n identifies the column of the matrix. Scan[][] is a matrix defining a zigzag scanning sequence. Dct_zz[] is a zigzag-scanned quantized DCT coefficient list. Each dct_zz[] matrix is associated with a particular block. Quantizer_scale, which may be specified in a header for each macroblock, is a number used to calculate DCT coefficients from the transmitted quantized coefficients. Intra_quant[][] is a intracoded picture quantizer matrix that is specified in a sequence header. Past_intra_address is the macroblock_address of the most recently retrieved intra_coded macroblock within a slice. (Pictures are divided into slices. Each slice consists of an integral number of macroblocks in raster scan order.)

Similarly, the ISO/IEC 11172-2 standard stipulates for inter-coded macroblocks that dct_recon[m][n], the matrix of reconstructed DCT coefficients of a block, shall be computed by any means equivalent to the following procedure:

```
for(m=0;m<8;m++){
  for(n=0; n<8; n++){
    i=scan[m][n];
    dct_recon[m][n]=(((2*dct_zz[i])+
        Sign(dct_zz{i}))*
        quantizer_scale*
        non_intra_quant[m][n])/16;
    if((dct_recon[m][n] & 1)==0)
        dct_recon[m][n]=dct_recon[m][n] -
          Sign(dct_recon[m][n]);
    if(dct_recon[m][n]>2047)
        dct_recon[m][n]=2047;
    if(dct_recon[m][n]<-2048)
        dct_recon[m][n]=-2048;
    if(dct_zz[i] == 0) dct_recon[m][n]=0;
  }
}
```

Non_intra_quant[][] is the non-intra quantizer matrix that is specified in the sequence header.

For a video system to provide a motion video capability, compressed video information must be quickly and efficiently decoded. One aspect of the decoding process is variable length code (VLC) decoding. Respective quantization steps for the intracoded and interceded decoding calculations:

$dct\_recon[m][n]=(2*dct\_zz[i]* quantizer\_scale*intra\_quant[m][n])/16$, and $dct\_recon[m][n]=(((2*dct\_zz[i])+Sign(dct\_zz\{i\}))* quantizer\_scale*non\_intra\_quant[m][n])/16$;

incur a heavy computational burden. It is estimated that approximately five coefficients are typically coded for each block. Six blocks form a macroblock. A SIF sized video frame includes 396 macroblocks. Thus, for each video frame, approximately 5*6*396=11880 DCT coefficients are coded. Accordingly approximately 11880 division and 23760 multiplication calculations are executed in the DCT VLC decoding for each frame. For a video system to provide a motion video capability, compressed video information must be quickly and efficiently decoded. Therefore, a substantial reduction in this computational burden is necessary.

SUMMARY OF THE INVENTION

In accordance with one embodiment of the present invention, a method of decoding variable length code (VLC) data includes the step of receiving a bitstream sequence organized into a hierarchy of levels including, in order, a sequence layer, a group of pictures layer, a picture layer, a slice layer, a macroblock layer, and a block layer. In the sequence layer, the method defines a quantization matrix. In a macroblock layer, the method defines a quantizer scale parameter, multiplies the quantization matrix times the quantizer scale parameter and stores the product in a quantization multiplication factor. In the block layer, the method parses an encoded data bitstream to detect a VLC code in the block layer and dequantizes the VLC code by multiplying the VLC code times the quantization multiplication factor.

Use of the decoding method described herein has several advantages. One advantage is that the computational burden is substantially lessened. Another advantage is that such lessening of the computational burden promotes a motion video capability.

DETAILED DESCRIPTION

Figure 1:
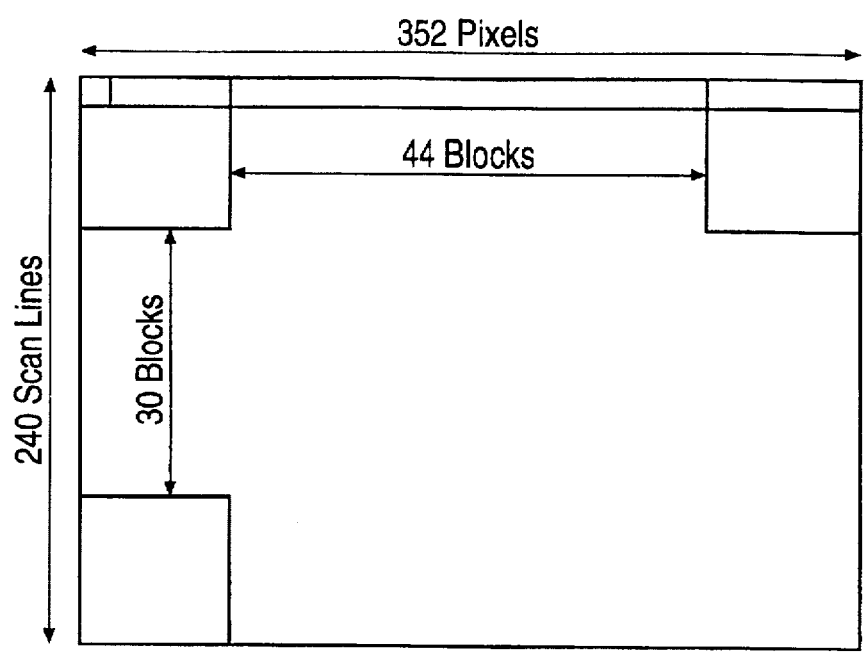
FIG. 1, labeled prior art, shows an arrangement of blocks of pixels on a display screen.
Figure 2:
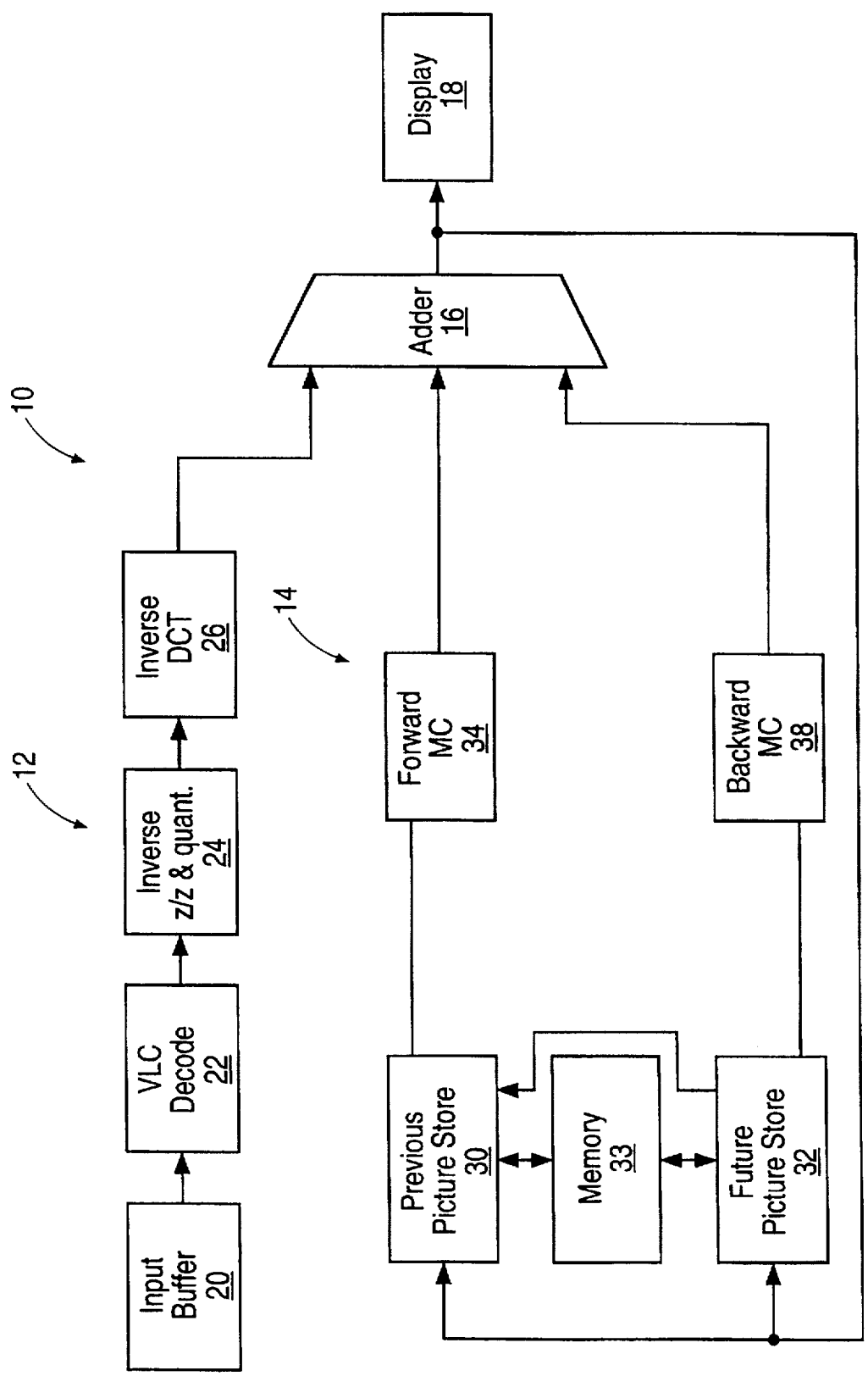
FIG. 2 shows a block diagram of a decoder video system in accordance with the present invention.

Referring to FIG. 2, a system for decompressing video information is shown. Video system 10 includes input stream decoding portion 12 incorporating an inverse discrete cosine transformation, motion decoding portion 14, adder 16 and display device 18. Input stream decoding portion 12 receives a stream of compressed video information and provides blocks of statically decompressed video information to adder 16. Motion decoding portion 14 receives motion information and provides motion compensation information to adder 16. Adder 16 receives the statically decompressed video information and the motion compensation information and provides decompressed video information to display 18.

Input stream decoding portion 12 includes input buffer 20, variable length coding (VLC) decoder 22, inverse zig-zag and quantizer circuit 24 and inverse discrete cosine transform circuit 26. Motion decoding portion 14 includes previous picture store circuit 30, future picture store circuit 32, memory 33, forward motion compensation circuit 34 and backward motion compensation circuit 38. Display device 18 includes a picture buffer (not shown) which allows information provided by adder 16 to be rasterized prior to display by display device 18.

Input stream decoding portion 12 provides statically decompressed video signals to adder 16 on a block-by-block basis. Additionally, forward motion compensation circuit 34 and backward motion compensation circuit 38 of motion decoding portion 14 provide motion compensation signals to adder 16 on a macroblock by macroblock basis. Adder 16 provides a decompressed video signal to display 18 on a picture by picture basis. The decompressed video signal is also provided as a previous picture signal to previous picture store circuit 30 and future picture store circuit 32 (in the case of an I or P picture).

Figure 3:
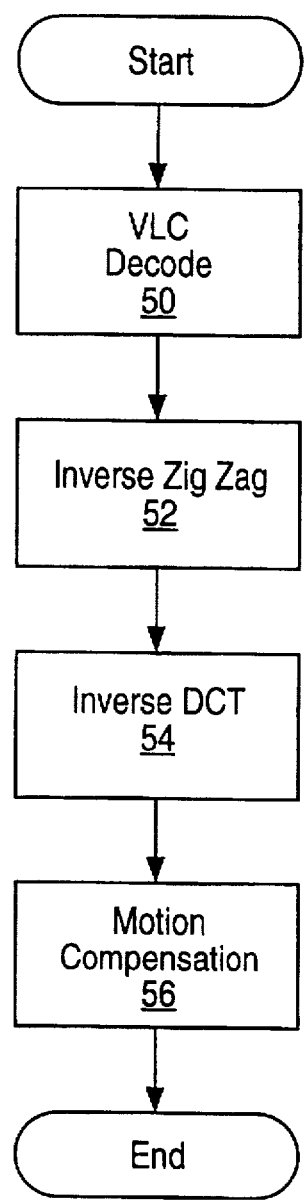
FIG. 3 shows a flow chart of the decoding of video information which is encoded using the MPEG standard.

Referring to FIGS. 2 and 3, in operation, input buffer 20 receives a compressed video signal in the form of a bitstream from a video signal source such as a CD ROM (not shown); the compressed video signal is provided as a stream of compressed video information. Input buffer 20 buffers this compressed video signal to compensate for the speed which the signal is provided by the video source. The input bitstream is accumulated in the input buffer 20 until the bitstream data is to be utilized. This buffered compressed video signal is provided to VLC decoder 22 which decodes the variable length coded portion of the compressed signal at VLC decoding step 50 to provide a variable length decoded signal.

The variable length decoded signal is provided to inverse zig-zag and quantizer circuit 24 which, at inverse zig-zag and quantization step 52, decodes the variable length coded signal to provide a zig-zag decoded signal. Inverse zig-zag and quantizer circuit 24 produces actual DCT coefficients using a preset quantization step size. When a signal is encoded, data is run-length encoded in zig-zag ordering across an image so that compression is optimized. In general, most of the energy in an image is concentrated at the low frequency coefficients, which are conventionally written in the upper left corner of the transformed matrix. Therefore, image data which has been converted to a frequency representation typically has larger coefficients at lower spatial frequencies, clustered at the upper left corner of a frequency image block. Coefficients typically decrease along rays extending from the zero-frequency, or DC, term to higher spatial frequency terms. A block of data is compressed by discrete cosine transform (DCT) coefficient quantization. Discrete cosine transformation shifts the energy of the block to lower frequency coefficients. Quantization serves to remove small coefficients—coefficients that are smaller than a quantization step. Higher frequency coefficients have a larger quantization step. Zig-zag ordering is used to reorder the quantized discrete cosine transform (DCT) block of coefficients so that non-zero coefficients are transmitted first, thereby increasing transmission efficiency. The inverse zig-zag and quantization step 52 compensates for the fact that, while a compressed video signal is compressed in a zig-zag run length code (or decode) fashion, the zig-zag decoded signal is provided to inverse DCT circuit 26 as sequential blocks of video information. Accordingly, this zig-zag decoded signal provides blocks which are in a suitable order for raster scanning across display 18.

When a signal is encoded, an image block is first transformed from the spatial domain to the frequency domain using the Discrete Cosine Transform (DCT), which separates the signal into independent frequency bands. Most of the frequency information is in the upper left corner of the resulting block. The zig-zag decoded signal is applied to inverse DCT circuit 26 to convert the frequency domain image into the spatial domain. The inverse DCT circuit 26, at inverse DCT step 54, performs an inverse discrete cosine transform on the zig-zag decoded video signal on a block-by-block basis to provide a statically decompressed video signal. This statically decompressed video signal corresponds to a single picture of video information. This single picture of video information may be used to present a static image on display 18 or may be used as a picture within a sequence of pictures for presentation of a motion image on display 18.

The statically decompressed signal is provided to adder 16 which, if the signal does not include any motion information (i.e., I pictures) provides this signal to display 18. However, for video signals which include motion information (i.e., B pictures and P pictures), adder 16 uses the forward motion compensation and backward motion compensation outputs from motion decode portion 14 to generate the video information which is provided to display 18 at motion compensation step 56. More specifically, forward motion vectors are used to locate information in previous picture store circuit 30 and backward motion vectors are used to locate information in future picture store circuit 32 and this information is added to the output provided by inverse DCT circuit 26.

VLC decoder 22 decodes a sequence of pictures in the following manner. VLC decoder 22 first decodes the header of a first picture, called picture 0, and determines that it is an I-picture. VLC decoder 22 produces quantized coefficients corresponding to the quantized DCT coefficients. These are assembled for each 8 by 8 block of pixels in the image by inverse zig-zag scanning. VLC decoder 22 decodes the header of the next picture, picture 3, and determines that it is a P-picture. For each inter-coded macroblock, the VLC decoder 22 decodes motion vectors giving the displacement from the stored previous picture, and quantized coefficients corresponding to the quantized DCT coefficients. The quantized DCT coefficients are error terms in the form of a difference block. For an intracoded macroblock, all six blocks include IDCT values. For inter-coded or predicted macroblocks, not all six blocks include IDCT error terms. These quantized coefficients are inverse quantized to produce actual DCT coefficients. The coefficients are transformed into pixel difference values and added to the predicted block which are generated by applying the motion vectors to macroblocks in the stored previous picture. The resultant macroblock is displayed on display 18. This picture is not displayed until B-pictures 1 and 2 have been received, decoded, and displayed. VLC decoder 22 decodes the header of the next picture, picture 1, and determines that it is a B-picture. For each inter-coded macroblock, the VLC decoder decodes motion vectors giving the displacement from the stored previous or future pictures or both, and quantized coefficients corresponding to the quantized DCT coefficients of the difference block. These quantized coefficients are inverse quantized to produce actual DCT coefficients. The coefficients are inverse transformed into difference pixel values and added to a predicted macroblock produced by applying the motion vectors to the stored pictures. The resultant macroblock is stored in memory 33. The macroblock is displayed at a suitable time.

One example of a method for parsing DCT VLC codes in a VLC bitstream is to use the VLC code as in index into a lookup table (ISO/IEC 11172-2 standard Tables B.5(c), B.5(d) and B.5(e), Pages 45–47 of ISO/IEC 11172-2:1993) containing a run length parameter and a level parameter for each DCT VLC code. Although this example illustrates parsing of DCT VLC codes, a similar method is employed for parsing macroblock addressing, macroblock type, macroblock pattern and motion vector VLC codes, for example. In the DCT VLC code method, a run length describes the advancement from one coded DCT coefficient to the next coded DCT coefficient in zig zag scan order. The level table value designates the level or amplitude of the DCT coefficient. The zigzag-scanned quantized DCT coefficient list is updated as follows for a first DCT coefficient (a variable length code for the first retrieved coefficient):

i=run;
if (s==0) dct__zz(i)=level;
if (s==1) dct__zz(i)=–level;

Terms of the first DCT coefficient are run-length encoded and dct__zz(i),i>=0 are set to zero initially. The zigzag-scanned quantized DCT coefficient list is updated as follows for a next DCT coefficient (a variable length code for a coefficient retrieved subsequently to the first coefficient):

i=i+run+1;
if (s==0) dct__zz(i)=level;
if (s==1) dct__zz(i)=–level;

If macroblock__intra is equal to 1 then the term i is set to one before the first next DCT coefficient of the block.

In addition to the tabulated codes, the ISO/IEC 11172-2 standard also specifies several escape case codes in ISO/IEC 11172-2 standard (Table B.5(f) Page 48 of ISO/IEC 11172-2:1993). An escape code is a special codeword for coefficients which have unusual run and level values. Escape case codes occur infrequently in the VLC bitstream.

The maximum number of bits in a DCT VLC code that is not an escape code is sixteen bits. Therefore, a sixteen bit index is parsed to select an entry of lookup table (ISO/IEC 11172-2 standard Tables B.5(c), B.5(d) and B.5(e), Pages 45–47 of ISO/IEC 11172-2:1993). In contrast, escape codes are a fixed-length code so that no table lookup is used.

Parsing of the VLC bitstream using a lookup table approach is most efficient for decoding of lengthy bit codes. For short VLC codes, efficiency of the lookup table approach is limited since the method generally employs accessing of many bits which are not utilized for the decoding of a first code but which must be accessed again later for decoding of a subsequent code. Furthermore, the lookup table method involves steps of locating an appropriate lookup table, calculating an index to the table, determining the bitlength of a code, restoring bits which are not used and acquiring a VLC value from the table. Thus, checking of the table with a code value is typically slower than directly testing a few bits in a register for short VLC codes. An alternative method of parsing the bitstream involves usage of a binary tree search approach.

Figure 4:
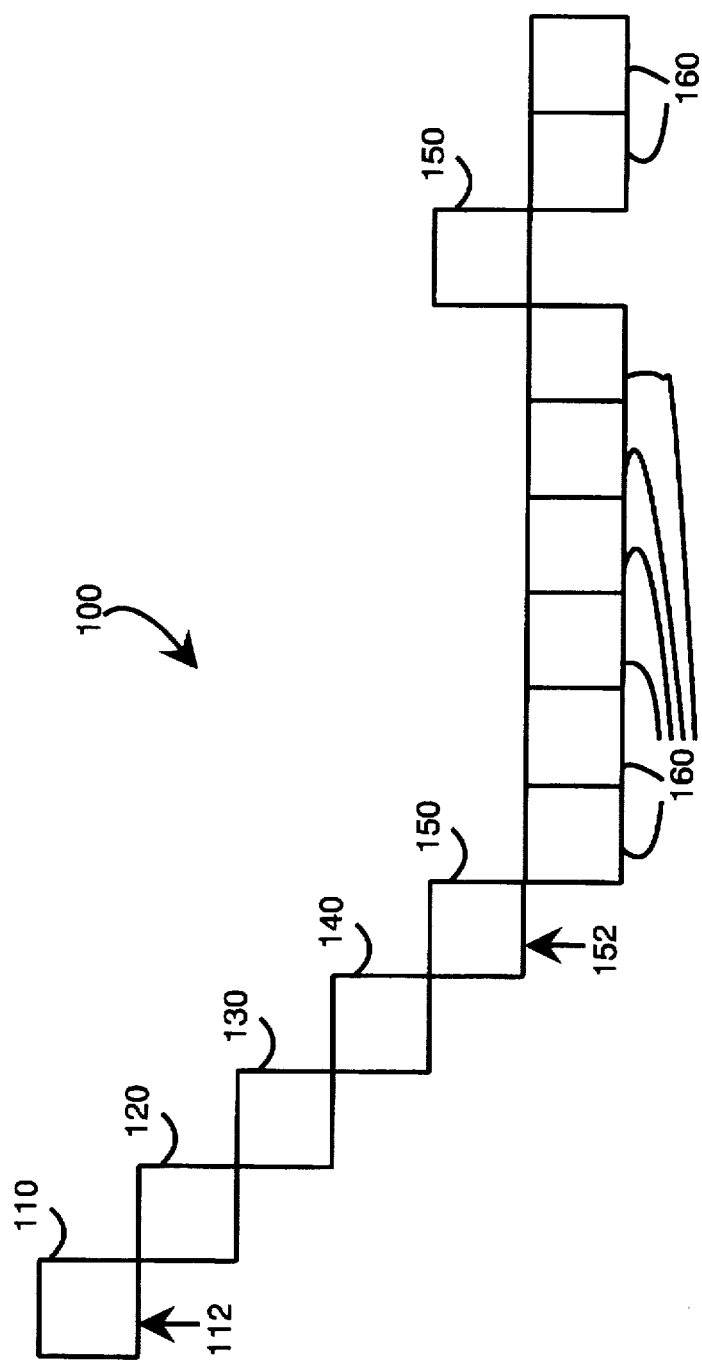
FIG. 4 illustrates a processing diagram of a video sequence.

Referring to FIG. 4, a video sequence 100 is organized into a hierarchy of levels including in order a sequence layer 110, a group of pictures layer 120, a picture layer 130, a slice layer 140, a macroblock layer 150, and a block layer 160.

The video sequence 100 begins with a sequence header signifying the beginning of a sequence layer 110 and is followed by a sequence body including one or more groups of pictures 120. A sequence end code terminates the video sequence 100. Additional sequence headers within the sequence body are allowed to permit random access into the video sequence. A sequence header includes a data block including various data elements. The sequence header defines quantization matrices 112 including intra__quantizer__matrix and non__intra__quantizer__matrix.

A group of pictures 120 is a set of pictures in a specific order. Two distinct picture orderings exist, a display order and a bitstream order. A group of pictures is a set of pictures which are contiguous in display order. A group of pictures must contain at least one I picture, which may be followed by any number of I and P pictures with any number of B pictures interspersed between each pair of I or P pictures. In bitstream order, a group of pictures must begin with an I picture and may be followed by any number of I, P or B pictures in any order. In display order, a group of pictures begins with an I or B picture and must end with an I or P picture. The smallest group of pictures is a single I picture, the largest is unlimited in size.

A picture 130 contains all coded information for one picture. A picture is divided into slices 140. Each slice 140 includes an integral number of macroblocks 150 in raster scan order. Slices may vary in size within a picture. A slice 140 can begin and end at any macroblock 150 in a picture so long as the first slice begins at the top left of the picture and the end of the last slice resides at the bottom right macroblock of the picture. Slices cannot overlap or leave gaps between other slices. Each slice includes a code which defines the quantization scale.

A slice 140 is divided into macroblocks 150 of 16 by 16 pixels. A macroblock 150 is coded with a header that contains an optional quantizer scale 152 designation. Macroblock coding includes coding of a motion vector.

A block 160 is an array of 8 by 8 component pixel values which are treated as a unit and input to a discrete cosine transform (DCT) processor. Blocks of 8 by 8 pixels are transformed into arrays of 8 by 8 DCT coefficients using a two dimensional discrete cosine transform.

A VLC DCT decoding procedure determines a result of ISO/IEC 11172-2 standard equations:

dct__recon[m][n]=(2*dct__zz[i]* quantizer__scale*intra__quant[m][n])/16.

for intracoded blocks and:

dct_recon[m][n]=(((2*dct_zz[i])+Sign(dct_zz{i}))*
    quantizer_scale*non_intra_quant[m][n])/16, for interceded blocks. The various elements of these equations are set at different levels of the video sequence hierarchy. In particular, quantization matrices 112 intra_quantizer_matrix and non_intra_quantizer_matrix are determined at the sequence level 110. Quantizer_scale 152 is available at the macroblock level 150. The value dct_zz[i] is the only element that is set as the bitstream is decoded (at block level 160). Substantial savings in computation is achieved by executing as many calculations as possible at the highest level of hierarchy. Accordingly, the multiplication by two and division by 16 are hard-coded as a division by 8. Furthermore, multiplication of quantizer_scale times the quantizer matrix (intra_quant[][] or non_intra_quant [][] and division of the resulting product by 8 are executed at the macroblock level 150 and, since the quantization scale factor is typically fairly constant from macroblock to macroblock, executed only when the quantizer_scale has changed from the last macroblock to the current macroblock. The result of this calculation, a quantization multiplication factor, is then saved for usage when the individual codes of the bitstream are decoded.

Various techniques are employed for saving and retrieving the quantization multiplication factor. For example in a first embodiment, the quantization multiplication factor is saved in a table and the table is read as codes are parsed from the bitstream. Assembly code for retrieving the quantization multiplication factor is exemplified as follows:

MOV EAX, [ptr]
MUL EAX,EBX in which a pointer (ptr) to the appropriate table entry is furnished at the macroblock level and used to load register EAX from the table. Register EAX is multiplied by register EBX which holds the current VLC code.

In a second embodiment, when the quantization multiplication factor is set at the macroblock level, it is stored directly into the execution code at a location which was identified when the execution code was compiled. In this "self-modifying code" embodiment, the stored quantization multiplication factor is retrieved during parsing of the bitstream in a single instruction, as follows:

MUL EAX,[ptr]

in which the pointer (ptr) to the appropriate hardcoded and self-modifying-code set entry is set at the macroblock level and is multiplied by register EAX which is loaded with the current VLC code.

Figure 5:
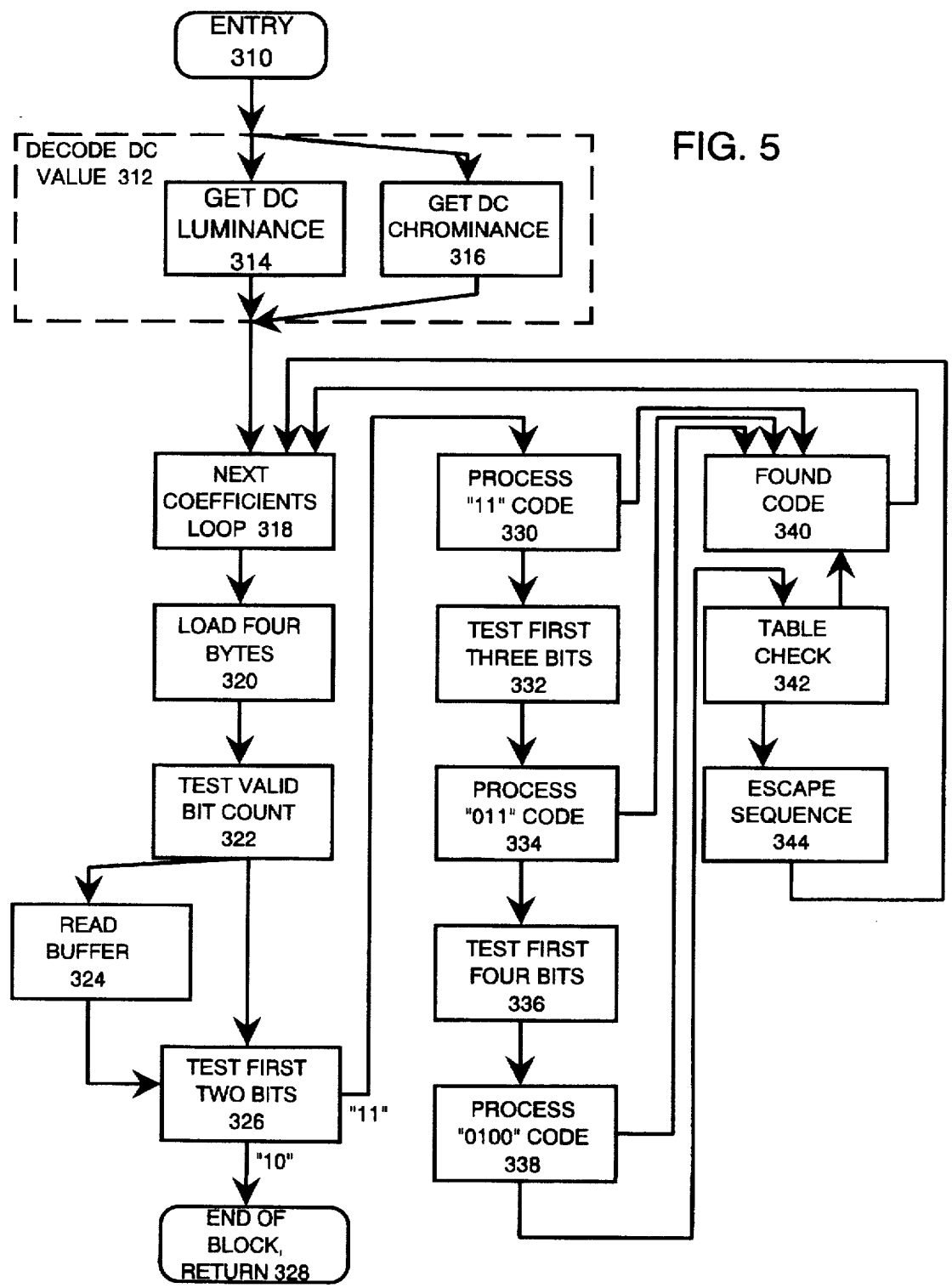
FIG. 5 illustrates a flow chart describing a hybrid method for parsing coded discrete cosine transform (DCT) coefficients of an intracoded block.

FIG. 5 illustrates a flow chart which describes a hybrid method for parsing coded discrete cosine transform (DCT) coefficients of an intracoded block. Intracoding of a macroblock or picture is a coding that uses information only from that macroblock or picture. An intracoded block is one of six blocks within one macroblock. Blocks 0–3 are luminance blocks and blocks 4 and 5 are chrominance blocks. A luminance block is a block representing a monochrome representation of a signal and related to the primary colors in the manner defined in CCIR Rec. 601. The symbol used for luminance is Y. A chrominance block is a block which represents one of the two color difference signals related to the primary colors in the manner defined in CCIR Rec 601. The symbols used for the color difference signals are Cr and Cb. Two input parameters are furnished upon entry 310 into the method processing. A first parameter is an identification number (0–5) of the block within the macroblock which is to receive the decoded bitstream data. A second parameter is a prediction value for the DC coefficient. The DC coefficient is the DCT element for which the frequency is zero in both spatial dimensions. The method accesses a data structure which furnishes three globally accessible components, including a pointer to a block to receive the decoded bitstream data, a count of the number of valid bits remaining in a buffer supplying the bitstream data and an array of quantization elements. The pointers to the input buffer point to a valid byte and to the invalid bits in the first valid byte so that, when the bitstream is loaded into a register, no calculation of a data starting point or data length are necessary. The quantization element array is a two dimensional (i,j) array containing elements designating one-eighth of the product of quantization scale values (i) and intracoded quantization matrix values (j). Additionally, the method acquires data from an input buffer which contains a coded data stream and the method supplies a data memory of decoded data at a block location designated by the block pointer.

The first coefficient of the block is the DC coefficient, which is decoded in decode DC value step 312. If the block identification number is less than four, the block is a luminance block and a luminance difference value is decoded in get DC luminance step 314. Otherwise, the block is a chrominance block and a chrominance difference value is decoded in get DC chrominance step 316. Also in decode DC value step 312, the difference value found in step 314 or 316 is added to the prediction value for the DC coefficient.

Additional coefficients of the block are then decoded, beginning with next coefficients loop step 318. Four bytes of bitstream data are acquired from the input buffer in load four bytes step 320. If too few valid bits remain in the buffer for additional parsing, test valid bit count step 322 selectively activates read buffer step 324 to access four bytes of data from the buffer. Generally, frequently-occurring DCT VLC codes have fewer than 5 bits so that, if the number of valid bits in a register is larger than five, then there is no need to reload the coded bitstream from input buffer to the register. As bits of the buffer are processed, the bits which have already been processed are termed invalid bits and the remaining bits to be processed are called valid bits. Loading of the bitstream from the input buffer orders the valid bits from most significant bit (MSB) to least significant bit (LSB) in a register so that a branch search by testing the first few bits at the upper part of the register is faster than shifting and masking the bits at the lower portion of the register. Furthermore, pointers to the input buffer include a first pointer to the valid byte and a second pointer to the invalid bits in the first valid byte so that when the bitstream is loaded from the input buffer to a register, no calculation of starting point in the buffer or bits to be shifted are necessary.

The first two valid bits of the bitstream are accessed from the buffer in test first two bits step 326 to determine whether the bits designate the values "10" or "11". If so, process first two bits step 326 either terminates the method in end of block return step 328 when the two bits designate the "10" value or processes a "11" value in process "11" code step 330. The end of block symbol indicates that no additional non-zero coefficients are present. Process "11" code step 330 advances the valid bit count two bits to the position of a sign bit, sets the level to 1 and branches to found code step 340. If the first two bits do not designate values "10" or "11", test first three bits step 332 determines whether the three bits designate a "011" value and, if so, process "011" code step 334 advances the valid bit count three bits to the position of a sign bit, advances the run length by 1, sets the level to 1 and branches to found code step 340. If the first three bits do not designate value "011", test first four bits step 336 determines whether the four bits designate a "0100" or a "0101" value. If a "0100" code is designated, process "0100" code step 338 advances the valid bit count four bits to the position of a sign bit, sets the level to 2 and branches to found code step 340. If a "0101" code is designated, process "0100" code step 338 advances the valid bit count four bits to the position of a sign bit, advances the run length by 2, sets the level to 1 and branches to found code step 340. If the first four bits do not designate values "0100" or a "0101" value, test first four bits step branches to table check step 342.

At found code step 340, the procedure has found a complete and proper code and found code step 340 converts the code into a decoded value. Found code step 340 then loads a decoded value resulting from the conversion into a block location designated by the block pointer. The decoded value is attained by utilizing the run length parameter as an array index into a zig_zag scan array. The zig_zag scan array is an 8×8 array of discrete cosine transform (DCT) coefficients in a zig zag order. Zig zag order is shown in TABLE 1 as follows:

TABLE 1

| 0  | 1  | 5  | 6  | 14 | 15 | 27 | 28 |
|----|----|----|----|----|----|----|----|
| 2  | 4  | 7  | 13 | 16 | 26 | 29 | 42 |
| 3  | 8  | 12 | 17 | 25 | 30 | 41 | 43 |
| 9  | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

Found code step 340 determines the result of the ISO/IEC 11172-2 standard equation:

dct_recon[m][n]=(2*dct_zz[i]* quantizer_scale*intra_quant[m][n])/16.

In this equation, the found element of the zigzag-scanned quantized DCT coefficient list, Dct_zz[], refers to a particular VLC level. The intracoded quantization matrix, intra_quant[n][m], refers generally to a particular quantizer matrix element, quantizer_matrix[i]. The matrix of reconstructed DCT coefficients of a block, dct_recon[m][n], refers to a particular found coefficient, coeff[i], which relates to a particular element of the quantizer_matrix[i]. Accordingly, the ISO/IEC 11172-2 standard equation is simplified to an equation as follows:

coeff[i]=quantizer_scale*quantizer_matrix[i]* VLC_level/8.

Execution of multiplication and division instructions is relatively burdensome, therefore computational efficiency is enhanced by precalculating the multiplication operation of quantizer_scale and quantizer_matrix[i] and the division by 8. The precalculated value is saved in a quantization value table for decoding of individual coefficients. For decoding intracoded blocks from multiple VLC codes in a bitstream, the quantization value table, qvatable[i][j], is defined as:

qvatable[i][j]=i*quantizer_matrix[j]/8, where i is a quantization scale value, j is a scan location in a block. The quantization value table is precalculated just after the intracode quantizer matrix is defined at the sequence header. This table is applied to the decoding of all intracoded blocks in the sequence.

The run length parameter is applied as the array index into the zig_zag scan array to acquire a second array index into an intracode quantization value table. The first array index into the intracode quantization value table is a quantizer scale parameter. The quantizer scale is a five-bit integer which is used by the decoder to calculate discrete cosine transform DCT coefficients from transmitted quantized coefficients. A value of 0 is not allowed, so the quantizer scale has an integer value between 1 and 31. A quantizer scale value applies to an entire macroblock. The first and second array indices are applied to the intracode quantization value table, together with the level value, to yield a decoded value. The decoded value is forced to an odd value in an oddification process. Oddification disallows even valued numbers to prevent accumulation of mismatch errors.

Found code step 340 then accesses a sign bit from the buffer and, if the sign is negative, complements the oddified and decoded value to furnish a negative value. Found code step 340 then advances the valid bit count one bit to the beginning of the next code. In some embodiments of the method, found code step 340 then performs a saturation check and limit operation in which a positive value is limited to 2047 and a negative value is limited to −2048. In other embodiments the saturation check and limit operation is not performed.

Found code step 340 then branches to test valid bit count step 322 to continue parsing the buffer stream.

Table check step 342 first checks to determine whether the valid bit count is less than sixteen bits. If so, an additional four bytes of bitstream data are accessed from the buffer. Table check step 342 then tests the first sixteen bits of bitstream data. Several tables are furnished including a table (DCTtab0) for 5 to 8 bit length codes, a table (DCTtab1) for 10 bit length codes, a table (DCTtab2) for 12 bit length codes, a table (DCTtab3) for 13 bit length codes, a table (DCTtab4) for 14 bit length codes, and a table (DCTtab5) for 15 bit length codes, a table (DCTtab6) for 16 bit length codes. Each table includes a run length entry, a level entry and a bit length entry.

If the code designated by the bitstream data is greater than or equal to 1024, the 5_to_8 bit code table DCTtab0 is accessed to acquire a run length designation, a bit length designation, and level designation. First the run designation is acquired and checked. If the run length is 65, then table check step 342 advances the valid bit count six bits and branches to an escape sequence step 344. Otherwise, table check step 342 accesses the bit length and level designations. Table check step 342 then advances the run length by the run length designation from the table, saves the level designation for later usage, and advances the valid bit count the number of bits set by the bit length designation. Table check step 342 then branches to found code step 340.

If the code designated by the bitstream data is greater than or equal to 512, the 10 bit code table DCTtab1 is accessed to acquire the run length, bit length and level designations. For codes greater than or equal to 256, the 12 bit code table DCTtab2 is accessed. For codes greater than or equal to 128, the 13 bit code table DCTtab3 is utilized. For codes greater than or equal to 64, the 14 bit code table DCTtab4 is utilized. For codes greater than or equal to 32, the 15 bit code table DCTtab5 is read. For codes greater than or equal to 16, the 16 bit code table DCTtab6 is accessed. Table check step 342 accesses the run length, bit length and level designations. Table check step 342 then advances the run length by the run length designation from the table, saves the level designation for later usage, and advances the valid bit count the number of bits set by the bit length designation. For each code, table check step 342 branches to found code step 340.

Escape sequence step 344 first checks to determine whether the valid bit count is less than 22 bits. If so, an additional four bytes of bitstream data are accessed from the buffer. Escape sequence step 344 uses the first six valid bits from the buffer as a run number. Escape sequence step 344 increments the run length by the running number and advances the valid bit count six bits. The run length is applied as an array index into the zig_zag scan array to acquire the second array index of the intracode quantization value table. The first array index into the intracode quantization value table is the quantizer scale parameter. Escape sequence step 344 then uses the next eight valid bits from the buffer as the level value and advances the valid bit count eight bits.

If the level value is equal to zero, escape sequence step 344 then uses an additional next eight valid bits from the buffer as the level value and advances the valid bit count eight bits. Escape sequence step 344 then multiplies the level value times the intracode quantization value table entry designated by the first and second array indices and sets the block value designated by the block pointer to the product.

If the level value is less than 128, escape sequence step 344 multiplies the level value times the intracode quantization value table entry designated by the first and second array indices and sets the block value designated by the block pointer to the product.

If the level value is greater than 128, escape sequence step 344 subtracts 256 from the level value, multiplies the level value after subtraction times the intracode quantization value table entry designated by the first and second array indices and sets the block value designated by the block pointer to the product.

If the level value is equal to 128, escape sequence step 344 uses an additional next eight valid bits from the buffer as the level value and advances the valid bit count eight bits. Escape sequence step 344 then subtracts 256 from the level value, multiplies the level value after subtraction times the intracode quantization value table entry designated by the first and second array indices and sets the block value designated by the block pointer to the product. The escape sequence is used to decode an escape code.

Figure 6:
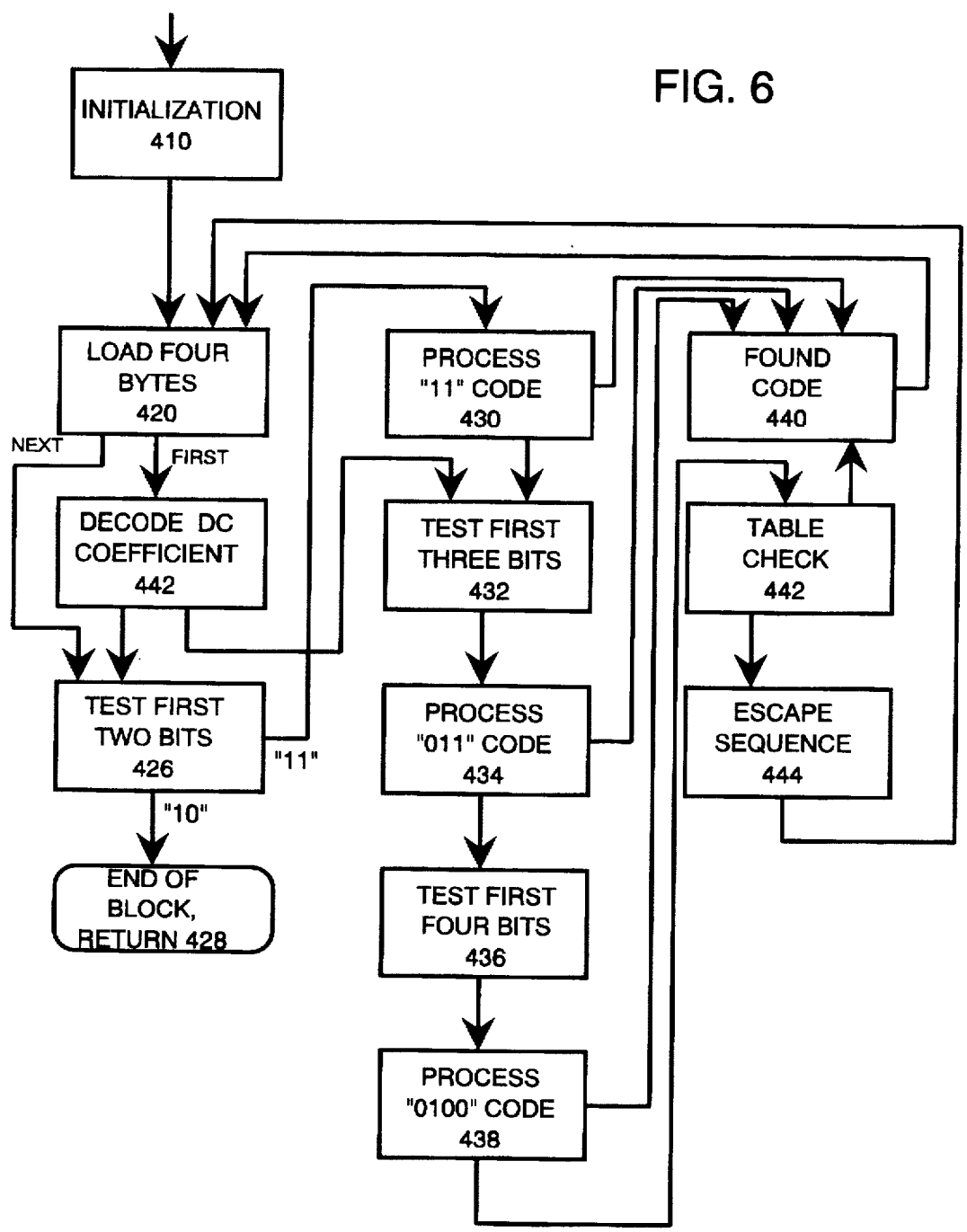
FIG. 6 illustrates a flow chart describing a hybrid method for parsing coded discrete cosine transform (DCT) coefficients of an intercoded block.

FIG. 6 illustrates a flow chart which describes a method for parsing coded discrete cosine transform (DCT) coefficients of an intercoded block. Intercoding of a macroblock or picture designates a coding on the basis of information from another macroblock or picture. The method acquires data from an input buffer which contains a coded data stream and the method supplies a data memory of decoded data at a block location designated by the block pointer. The first step of method is an initialization step 410 which accesses a data structure furnishing four globally accessible components, including a pointer to a block for receiving the decoded bitstream data, a count of the number of valid bits remaining in a buffer supplying the bitstream data and two precalculated quantization elements. A first quantization element is a level value designating one-eighth of the product of a quantization scale value and an intercoded quantization value corresponding to the level 1 table entry shown in ISO/IEC 11172-2 Lookup Table. A second quantization element is a level value of twice the first quantization element, representing one-eighth of the product of a quantization scale value and an intercoded quantization value corresponding to the level 2 table entry shown in ISO/IEC 11172-2 Lookup Table. The intercoded block parsing method efficiently utilizes precalculated and stored quantization elements. For decoding of a DCT code of an intercoded block, multiplication between the quantization scale and the non intracoded quantizer matrix are precalculated for a particular macroblock. Only the changing of the quantization scale leads to possible recalculation of the multiplication. Furthermore, only the first element of the non intracoded quantizer matrix is used for calculation. In contrast the intracoded block parsing method accesses the quantization scale value and the intracode quantization value table. The intercoded block parsing method is able to avoid this computational burden since: (1) all interceded coefficients use the same quantization step, (2) only two level coefficients—level 1 and level 2 are included in ISO/IEC 11172-2 Lookup Table for the first five codes, which are prestored as global dequantized values and (3) other level coefficients are obtained by one multiplication between the level value and the global first level dequantized value. In addition to accessing these components from the global buffer, initialization step also initializes a run length parameter to the value of zero.

Following initialization step 410, coefficients of the block are decoded, beginning with load four bytes step 420 which acquires four bytes of bitstream data from the input buffer. Then, using a method somewhat similar to the method discussed with respect to FIG. 6, the bitstream is decoded. Decode DC coefficient step 422 illustrates one difference between the decoding of an intracoded block and the decoding of an intercoded block. Decode DC coefficient step 422 is performed only when the first non-zero coefficient is decoded. In this instance, if the first bit has a "1" value, what is encoded is the DC coefficient (dct_coeff_first) for the new block in which the run is 0 and the level 1 (see NOTE2 of ISO/IEC 11172-2 standard Tables B.5(c), B.5(d) and B.5(e), Pages 45–47 of ISO/IEC 11172-2:1993). If the first bit of the DC coefficient is a 0 level bit, the code is a three or greater bit code and the method branches to test first three bits step 432. After the first coefficient is decoded, the first two valid bits of the bitstream are accessed from the buffer in test first two bits step 426 to determine whether the bits designate the values "10" or "11". If so, process first two bits step 426 either terminates the method in end of block return step 428 when the two bits designate the "10" value or processes a "11" value in process "11" code step 430. Process "11" code step 430 advances the valid bit count two bits to the position of a sign bit, sets the level to 1 and branches to found code step 440.

If the first two bits do not designate values "10" or "11", test first three bits step 432 determines whether the three bits designate a "011" value and, if so, process "011" code step 434 advances the valid bit count three bits to the position of a sign bit, advances the run length by 1, sets the level to 1 and branches to found code step 440. If the first three bits do not designate value "011", test first four bits step 436 determines whether the four bits designate a "0100" or a "0101" value. If a "0100" code is designated, process "0100" code step 438 advances the valid bit count four bits to the position of a sign bit, sets the level to 2 and branches to found code step 440. If a "0101" code is designated, process "0100" code step 438 advances the valid bit count four bits to the position of a sign bit, advances the run length by 2, sets the level to 1 and branches to found code step 440. If the first four bits do not designate values "0100" or a "0101" value, test first four bits step branches to table check step 442.

Found code step 440 determines the result of the ISO/IEC 11172-2 standard equation for interceded blocks, as follows:
dct_recon[m][n]=(((2*dct_zz[i])+Sign(dct_zz{i}))* quantizer_scale*non_intra_quant[m][n])/16,
in accordance with the aforementioned simplified equation:
coeff[i]=quantizer_scale*quantizer_matrix[i]* VLC_level/8.

Computational efficiency is enhanced by precalculating the multiplication operation of quantizer_scale and quantizer_matrix[i] and the division by 8. The precalculated value is saved in a quantization value table for decoding of individual coefficients. For intercoded blocks, elements in the quantizer matrix non_intra_quant[][] are all identical so that quantizer_matrix[i] is equal to quantizer_matrix [0], for example. Thus for decoding intercoded blocks from multiple VLC codes in a bitstream, the quantization value table, qvtable[j], is defined as:

qvtable[j]=j*quantizer_matrix[0]/8, where j is an integer value from 1 to 31 designating quantization scale. The values in this table are determined after the non_intra_quant_matrix is defined at the sequence header.

When a new quantization scale is specified in a macroblock header, a level 1 dequantized value and a level 2 dequantized value are recalculated. The level 1 dequantized value is determined by applying the new scale value as the index of the intercode quantization value table. The level 2 dequantized value is twice the level 1 dequantized value. These two level dequantized values, which are constant for all blocks of a macroblock, are stored as two global dequantized elements.

Found code step 440 replaces the level 1 and level 2 coefficients with the global level 1 and level 2 dequantized value. Other level coefficients receive dequantized values by multiplying the level value with the level 1 dequantized value.

Found code step 440 loads a decoded value into a block location designated by the block pointer. The run length parameter is applied as the array index into the zig_zag scan array to acquire an increment value for pointing to an element of the decoding buffer. The level value set in prior steps is used to determine the dequantized value. Found code step 440 then accesses a sign bit from the buffer and, if the sign is negative, complements the oddified and decoded value to furnish a negative value. Found code step 440 then advances the valid bit count one bit to the beginning of the next code. Found code step 440 then branches to process first two bits step 426 to continue parsing the buffer stream.

Table check step 442 of the intercoded block parsing method is substantially the same as table check step 342 of the intracoded block parsing method except that the precalculated and stored level 1 dequantized value is applied to determine a dequantized coefficient value, rather than the intracode quantization value table. Escape sequence step 444 of the intercoded block parsing method is substantially the same as escape sequence step 344 of the intracoded block parsing method except that, rather than using the intracode quantization value table, the precalculated and stored level 1 dequantized value is applied to determine a dequantized coefficient value.

The description of certain embodiments of this invention is intended to be illustrative and not limiting. Numerous other embodiments will be apparent to those skilled in the art, all of which are included within the broad scope of this invention. For example, the embodiments described herein are computer-based implementations. Electronic circuit based embodiments which perform the same function are expressly included within the scope of the claims.

What is claimed is:

1. A method of decoding variable length code (VLC) data comprising the steps of:

receiving a bitstream sequence organized into a hierarchy of layers including in order, a sequence layer a group of pictures layer, a picture layer, a slice layer a macroblock layer, and a block layer, defining a quantization matrix in the sequence layer;

defining a quantizer scale parameter in the macroblock layer;

multiplying the quantization matrix times the quantizer scale parameter and storing the product in a quantization multiplication factor in the macroblock layer;

parsing an encoded data bitstream to detect a VLC code in the block layer, wherein the parsing step is a hybrid parsing step wherein parsed coefficients coded by fewer than a predetermined number N bits are decoded using a bit testing step and coefficients decoded by more than N bits are decoded from a lookup table using bitstream data to address the lookup table and dequantizing the VLC code by multiplying the VLC code times the quantization multiplication factor in the block layer.

2. A method according to claim 1 wherein the quantization multiplication factor is saved in a table and the table is read as codes are parsed from the bitstream.

3. A method according to claim 1 wherein the quantization multiplication factor is stored directly into a program execution code at a location identified at compile time of the execution code.

4. A method according to claim 1, wherein the predetermined number N is equal to four.

5. An apparatus for decompressing video information comprising:

a microprocessor;

a video signal source coupled to the microprocessor and supplying a bitstream sequence organized into a hierarchy of layers including, in order, a sequence layer, a group of pictures layer, a picture layer, a slice layer, a macroblock layer, and a block layer;

a video display coupled to the microprocessor for displaying a sequence of video pictures; and a memory coupled to the microprocessor and including a plurality of data structures and program codes, wherein the program codes include:

a quantization matrix defining routine defining a quantization matrix in the sequence layer;

a quantizer scale defining routine defining a quantizer scale parameter in the macroblock layer;

a multiply routine for multiplying the quantization matrix times the quantizer scale parameter and storing the product in a quantization multiplication factor in the macroblock layer;

a parsing routine for parsing an encoded data bitstream to detect a VLC code in the block layer, wherein the parsing routine includes a hybrid parsing operation in which parsed coefficients coded by fewer than a predetermined number N bits are decoded using a bit testing step and coefficients decoded by more than N bits are decoded from a lookup table using bitstream data to address the lookup table; and a dequantizing routine for dequantizing the VLC code by multiplying the VLC code times the quantization multiplication factor in the block layer.

6. A computer program product operational in a video signal processor for decoding variable length code (VLC) data comprising:

a computer usable medium having computable readable code embodied therein including:

an executable program code for receiving a bitstream sequence organized into a hierarchy of layers including, in order, a sequence layer, a group of pictures layer, a picture layer, a slice layer, a macroblock layer, and a block layer;

an executable program code for defining a quantization matrix in the sequence layer;

an executable program code for defining a quantizer scale parameter in the macroblock layer;

an executable program code for multiplying the quantization matrix times the quantizer scale parameter and storing the product in a quantization multiplication factor in the macroblock layer;

an executable program code for parsing an encoded data bitstream to detect a VLC code in the block layer, wherein the executable program code for parsing includes a hybrid parsing operation in which parsed coefficients coded by fewer than a predetermined number N bits are decoded using a bit testing step and coefficients decoded by more than N bits are decoded from a lookup table using bitstream data to address the lookup table; and an executable program code for dequantizing the VLC code by multiplying the VLC code times the quantization multiplication factor in the block layer.

* * * * *

UNITED STATES PATENT AND TRADEMARK OFFICE
CERTIFICATE OF CORRECTION

PATENT NO. : 5,784,494　　　　　　　　　　　　　　Page 1 of 4
DATED　　　 : July 21, 1998
INVENTOR(S) : Strongin, et al It is certified that error appears in the above-identified patent and that said Letters Patent is hereby corrected as shown below:

On the title page, under the heading "Reference Cited - U.S. Patent Documents" insert the following:

--5,576,958　11/1996　Kawakatsu et al.　364/725--.
--5,386,232　01/1995　Golin et al.　　　348/391--.
--5,164,828　11/1992　Tahara et al.　　 358/136--.

under the heading "Other Publications" insert the following:

--Dr. Richard Baker, "Standards Dominate Videoconferencing Implementation", Computer Design, December 1994, pp. 66-70--.

--Stephen Ohr, "Digital Video Spearheads TV and Videoconferencing Applications", Computer Design, December 1994, pp. 59-64--.

--Lawrence A. Rowe, et al., "MPEG Video in Software: Representation, Transmission, and Playback", High Speed Networking and Multimedia Computing, Symp. on Elec. Imaging Sci. & Tech., San Jose, CA, February 1994, pp. 1-11--

--Peng H. Ang, et al., "Video Compression Makes Big Gains", IEEE Spectrum, October 1991, pp. 16-19--

UNITED STATES PATENT AND TRADEMARK OFFICE
CERTIFICATE OF CORRECTION

PATENT NO. : 5,784,494  Page 2 of 4
DATED : July 21, 1998
INVENTOR(S) : Strongin, et al It is certified that error appears in the above-identified patent and that said Letters Patent is hereby corrected as shown below:

--Andy C. Hung, et al., "A Comparison of Fast Inverse Discrete Cosine Transform Algorithms", Multimedia Systems ©1994, pp. 204-217--

--P1180/D1, "Draft Standard Specification for the Implementation of 8x8 Inverse Discrete Cosine Transform", 5-29-90, pp. 1-9--.

--ISO/IEC 11172-1, "Information Technology - Coding of Moving Pictures and Associated Audio for Digital Storage Media at up to about 1,5 Mbit/s - Part 1: Systems", 8-1-93, pp. i-vi, 1-53 --.

--ISO/IEC 11172-2, "Information Technology - Coding of Moving Pictures and Associated Audio for Digital Storage Media at up to about 1,5 Mbit/s - Part 1: Video", 8-1-93, pp. i-ix, 1-112--.

--ISO/IEC 11172-3, "Information Technology - Coding of Moving Pictures and Associated Audio for Digital Storage Media at up to about 1,5 Mbit/s - Part 1: Audio", 8-1-93, pp. 1-vi, 1-150--.

--Kevin L. Gong, et al., "Parallel MPEG-1 Video Encoding", Report, University of California, Berkeley, Computer Science Division, 1994, pp. 1-14--.

UNITED STATES PATENT AND TRADEMARK OFFICE
CERTIFICATE OF CORRECTION

PATENT NO. : 5,784,494
DATED : July 21, 1998
INVENTOR(S) : Strongin, et al

It is certified that error appears in the above-identified patent and that said Letters Patent is hereby corrected as shown below:

Col. 1, line 14, delete "Attorney Docket Number M-3223".

Col. 1, line 20, delete "Attorney Docket Number M-3224".

Col. 1, lines 25-26, delete "Attorney Docket Number M-3225".

Col. 1, line 31, delete "Attorney Docket Number M-3226".

Col. 1, lines 40-41, delete "Attorney Docket Number M-3228" and insert -- now U.S. Patent No, 5,680,482, issued October 21, 1997--.

Col. 1, line 47, delete "Attorney Docket Number M-3280".

UNITED STATES PATENT AND TRADEMARK OFFICE
CERTIFICATE OF CORRECTION

PATENT NO.  : 5,784,494
DATED       : July 21, 1998
INVENTOR(S) : Strongin, et al It is certified that error appears in the above-identified patent and that said Letters Patent is hereby corrected as shown below:

Col. 9, line 4, delete "interceded" and insert --intercoded--.

Col. 15, lines 64-66, delete "of layers including in order, a sequence layer a group of pictures layer, a picture layer, a slice layer a macroblock layer, and a block layer" and insert --of layers including, in order, a sequence layer, a group of pictures layer, a picture layer, a slice layer, a macroblock layer, and a block layer--.

Signed and Sealed this

Seventeenth Day of August, 1999

Attest:

Q. TODD DICKINSON

*Attesting Officer*    *Acting Commissioner of Patents and Trademarks*